United States Patent
Mouhebaty et al.

(10) Patent No.: US 6,908,545 B2
(45) Date of Patent: Jun. 21, 2005

(54) HYDRAULIC FILTER ASSEMBLY WITH PRIORITY VALVE

(75) Inventors: Bijan Mouhebaty, Westlake Village, CA (US); Daniel K. Moscaritolo, Thousand Oaks, CA (US)

(73) Assignee: PTI Technologies, Inc., Oxnard, CA (US)

( * ) Notice: Subject to any disclaimer, the term of this patent is extended or adjusted under 35 U.S.C. 154(b) by 89 days.

(21) Appl. No.: 10/215,110

(22) Filed: Aug. 8, 2002

(65) Prior Publication Data

US 2004/0026332 A1 Feb. 12, 2004

(51) Int. Cl.⁷ ................... B01D 35/147; B01D 35/157
(52) U.S. Cl. ............. 210/132; 210/133; 210/340; 210/444; 123/196 A; 123/195 S
(58) Field of Search ..................... 210/133, 444, 210/349, 132, 340, 253; 123/196 A, 196 S

(56) References Cited

U.S. PATENT DOCUMENTS

| | | | | |
|---|---|---|---|---|
| 2,098,725 A | * | 11/1937 | Hurn | 210/132 |
| 3,120,490 A | * | 2/1964 | Samson | 210/132 |
| 3,269,541 A | * | 8/1966 | Neely | 210/132 |
| 3,270,884 A | * | 9/1966 | Bremer | 210/90 |
| 4,038,189 A | | 7/1977 | Dison et al. | |
| 4,615,800 A | | 10/1986 | Stifelman et al. | |
| 4,783,271 A | * | 11/1988 | Silverwater | 210/742 |
| 5,067,454 A | * | 11/1991 | Waddington et al. | 123/196 S |
| 5,160,037 A | | 11/1992 | LeCour | |
| 6,733,666 B1 | * | 5/2004 | Wilkendorf et al. | 210/130 |

FOREIGN PATENT DOCUMENTS

| | | |
|---|---|---|
| DE | 20006981 | 6/2000 |
| WO | WO 99/21637 | 5/1999 |

OTHER PUBLICATIONS

European Search Report.

* cited by examiner

Primary Examiner—Terry K. Cecil
(74) Attorney, Agent, or Firm—Pillsbury Winthrop Shaw Pittman LLP

(57) ABSTRACT

A filter module assembly utilizes a priority valve installed in a manifold to allow for continuous filtration of hydraulic fluid up to a predetermined flow value and diverts occasional high flow to a secondary circuit. This arrangement provides both a low pressure drop at a high flow condition and structural integrity (1,000,000 impulse cycles from 0 to 6000 psi) while at the same time may reduce the weight by as much as 50% from a conventional design approach.

25 Claims, 15 Drawing Sheets

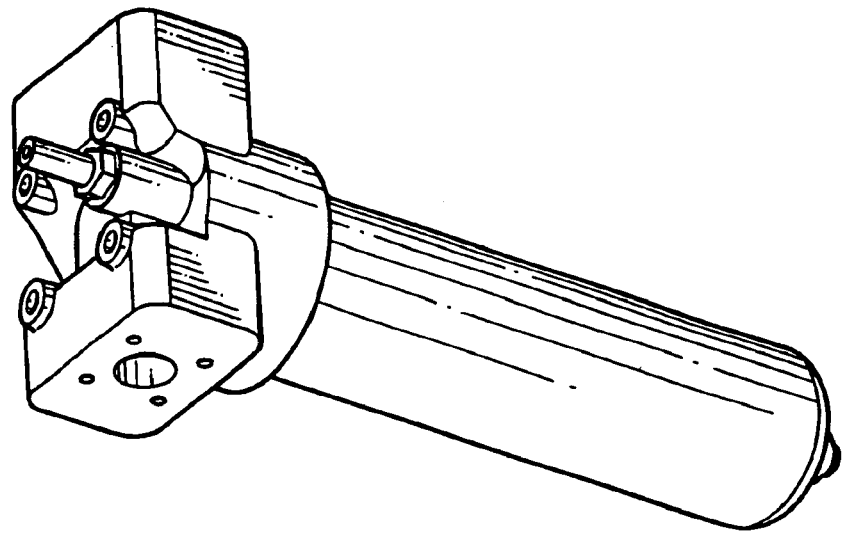
PRIOR ART
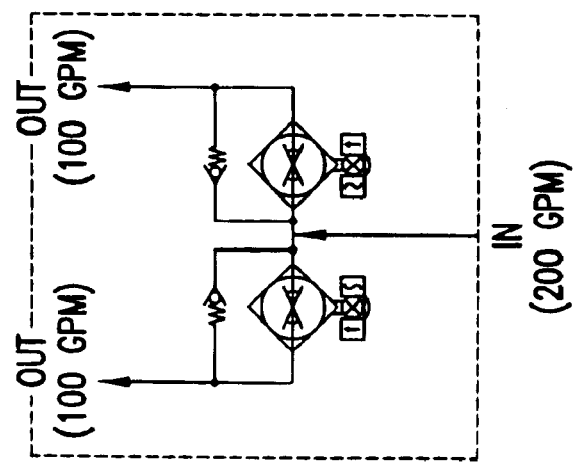
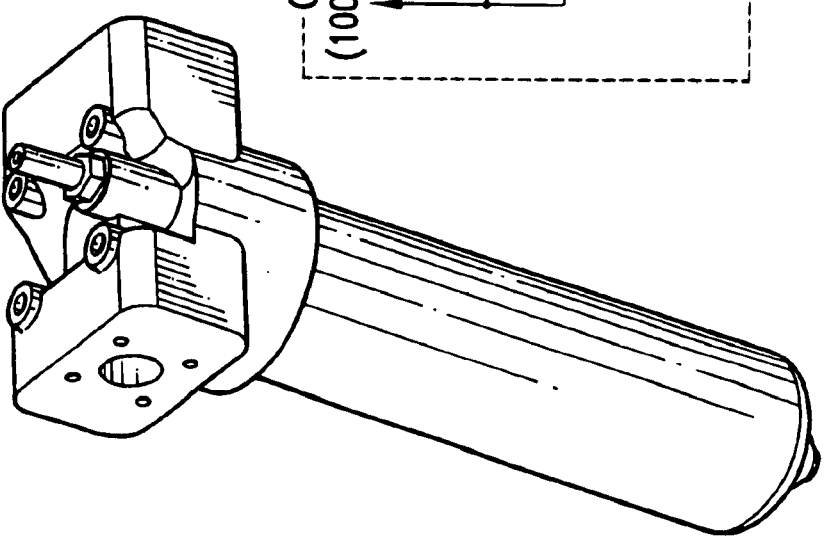
FIG.2

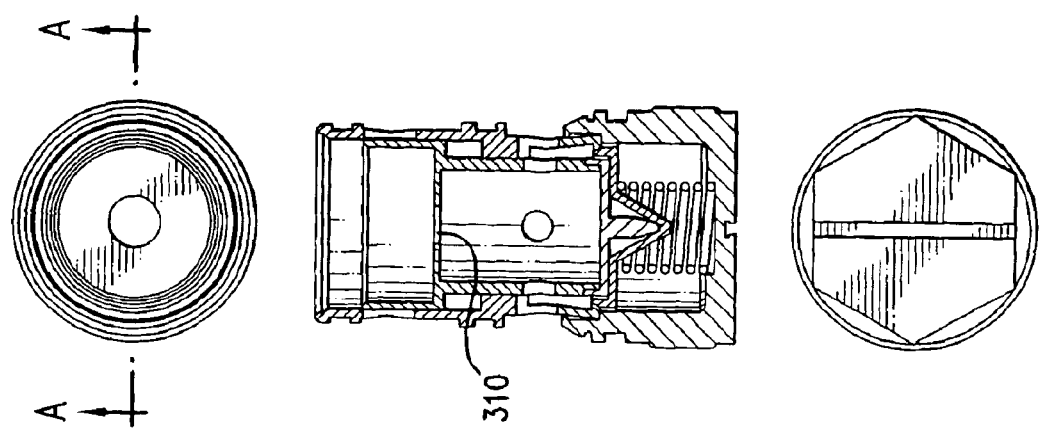
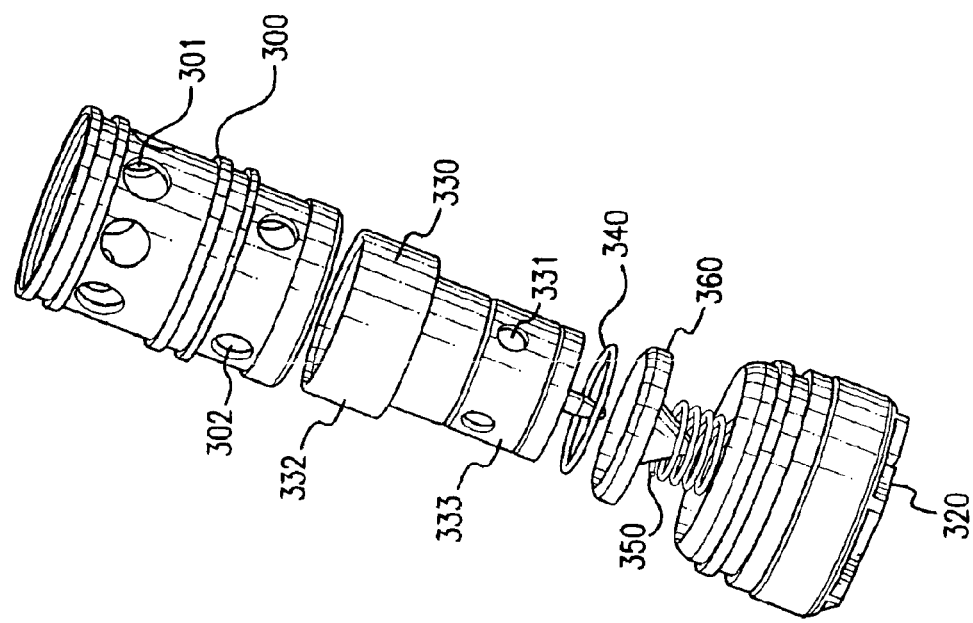
FIG.3A

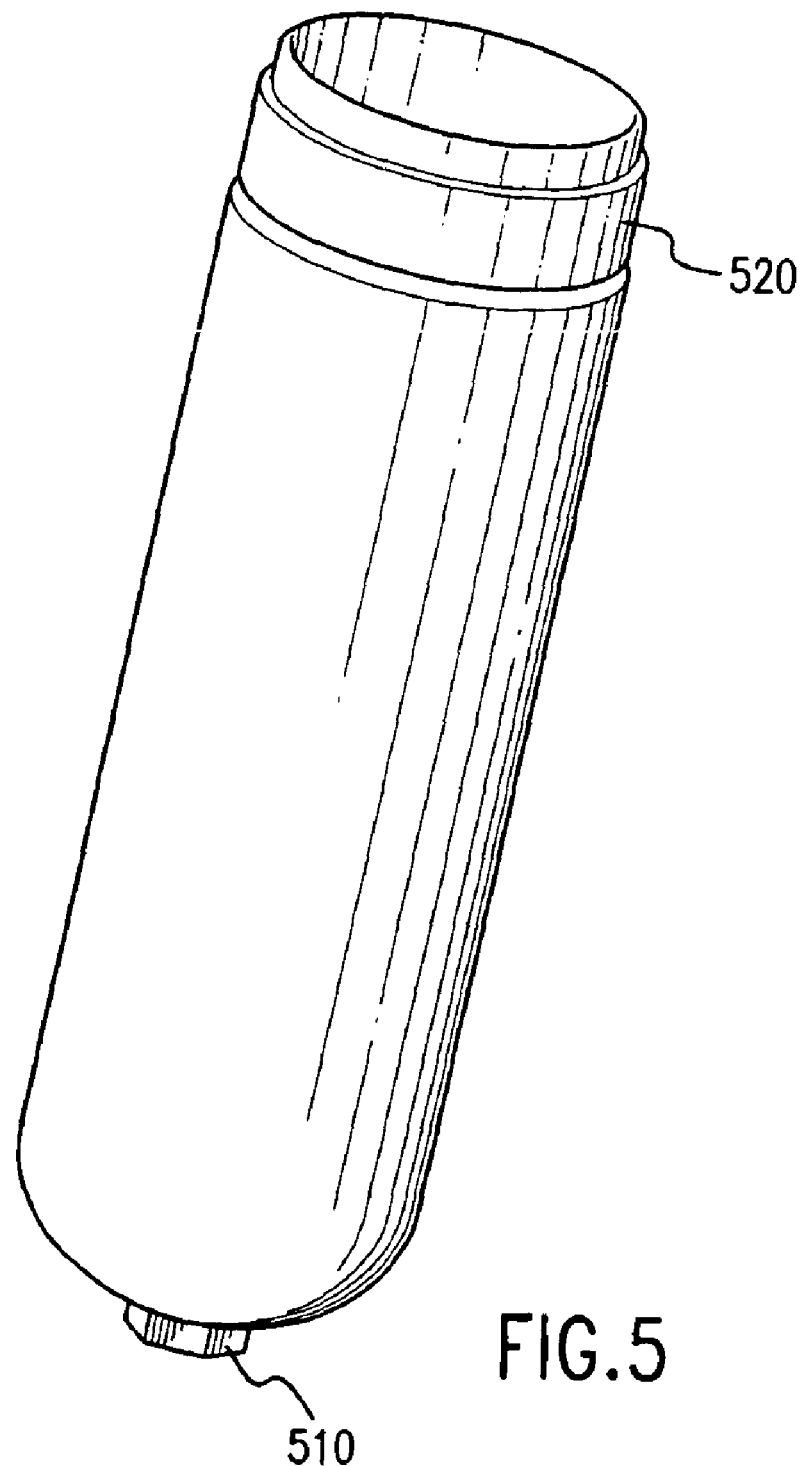

PRESSURE & RETURN ELEMENT 110

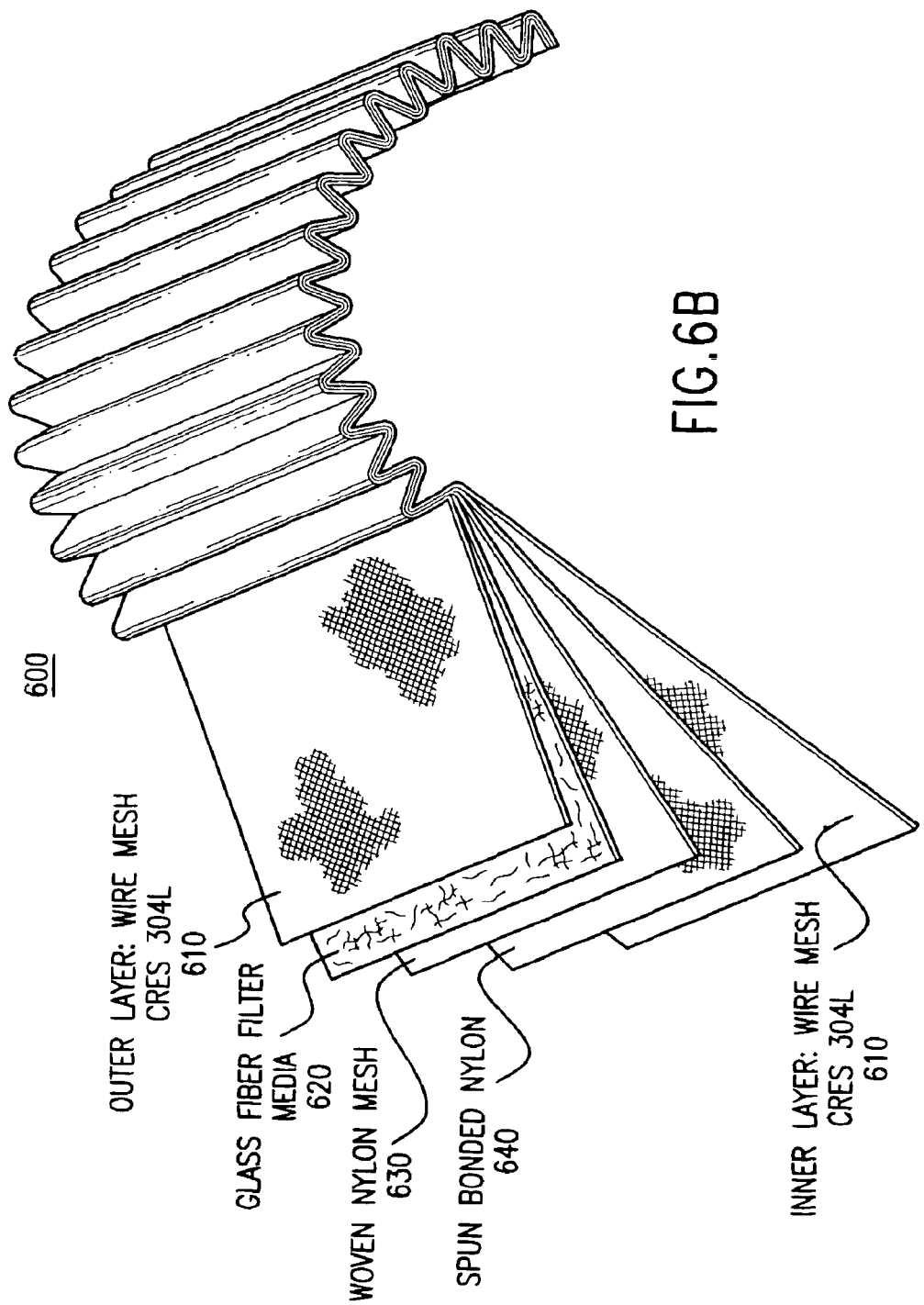

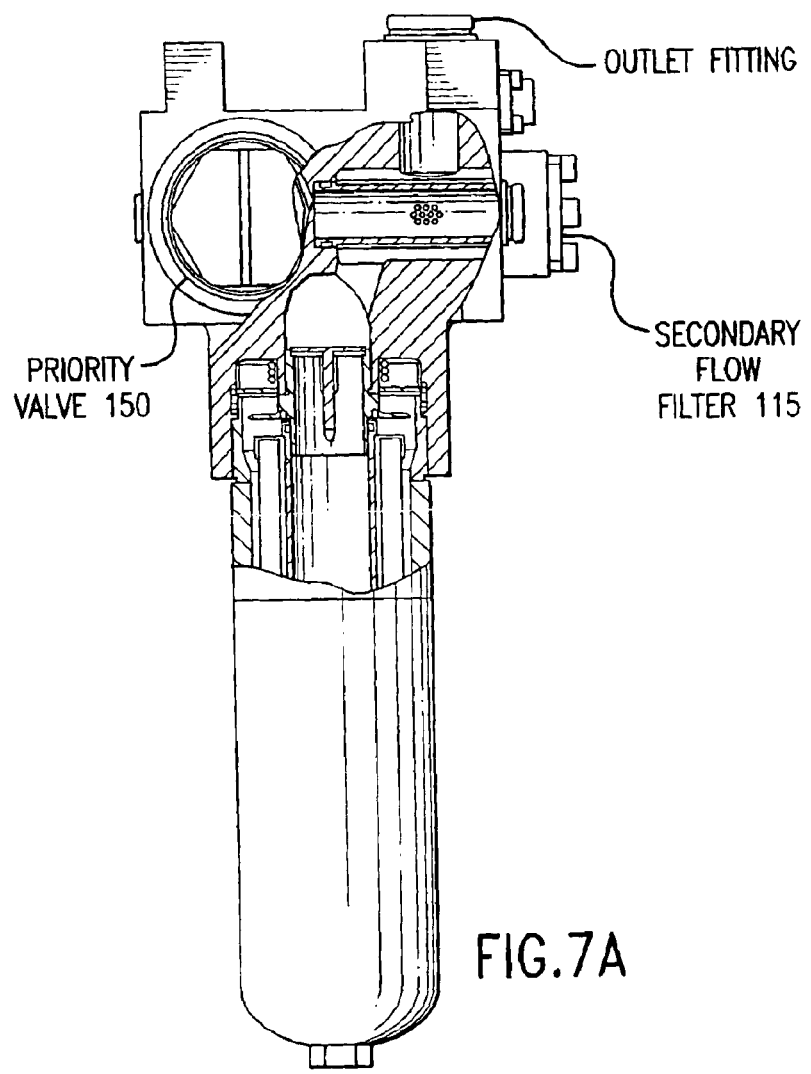
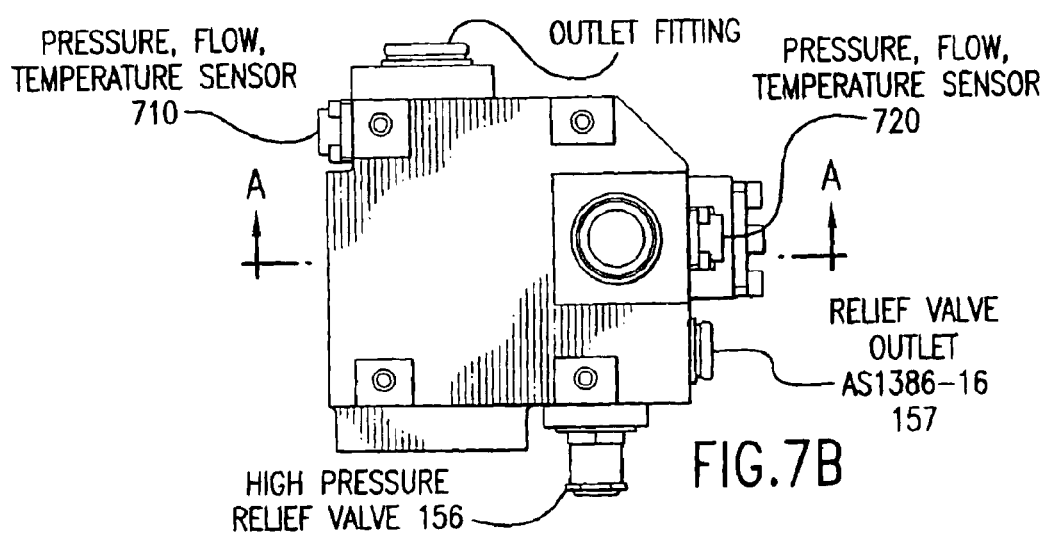
FIG.7A
FIG.7B

HYDRAULIC FILTER ASSEMBLY WITH PRIORITY VALVE

BACKGROUND OF THE INVENTION

1. Field of the Invention

The present invention generally relates to fluid filtration. More particularly, the present invention relates to a filter assembly for high pressure, high flow rate and low pressure drop applications.

2. Discussion of the Related Art

Fluid cleanliness and viscosity are two important properties of hydraulic fluid in a fluid power system. Contaminants may be supplied to the hydraulic system from sources both internal and external to the system. The level of undesirable contaminants in the hydraulic fluid affects the quality of system performance, as well as the useful life of substantially all of the working hydraulic components within a hydraulic system. All moving components in contact with the fluid are vulnerable to wear, and attendant premature failure if such contaminants are not removed from the system. Consequently, proper cleaning of the fluid to remove undesirable contaminants can significantly lengthen the life of the system components, as well as reduce maintenance and its attendant costs. Further, effective cleanliness control can result in significant improvements in the overall reliability and performance of the system.

Maintenance of a clean hydraulic fluid requires efficient filtration. A number of methods have been utilized to control the cleanliness of the fluid in hydraulic systems. The filters utilized in typical cleanliness control systems must withstand high pressure and/or high volume flow in certain applications. Consequently, such filter arrangements are often expensive and can contribute to related system problems.

Higher demands are made upon the hydraulic systems of aircraft. Microscopic particles present a significant problem because it is difficult to manufacture a filter element that is capable of removing very small particles and at the same time has a sufficient flow capacity and low pressure drop to meet the flow requirements of typical aircraft systems.

The flow capacity of a filter is a function of the surface area and micron removal rating. Aircraft have limited space and weight requirements. It is difficult to manufacture a filter element that is capable of removing fine particles, has a high flow capacity, a low pressure drop, is small in size, and is rugged enough for aircraft hydraulic systems.

For example, a filter may be interposed in line before the load to provide full flow filtering. This method is effective in many types of systems having relatively low fluid flow, e.g., 30 gallons per minute (gpm) or less. However, many hydraulic systems provide relatively large flows at high pressures, often running on the order of 400 gpm at pressures of 1000 pounds per square inch (psi) or greater. Interposing a filter in line before the load is often impractical in those high pressure systems with relatively large fluid flows. Further, maintaining filters in such an environment is generally quite expensive.

Alternately, full flow filtering may be provided after fluid has serviced the load. In this method of filtering, a filter is typically interposed in the return line between the load and the sump. Although less costly than filtering systems having the filter disposed before the load, return oil filtering can still be quite costly. Additionally, as return line filters become dirty, they develop back pressure. The development of back pressure can be a problem in that a number of valving systems do not perform properly with the application of back pressure.

An additional method of filtering disposes a filter in the sump. By nature, these filters are coarse so as not to affect flow of fluid to the pump. Consequently, while this method may be effective for filtering large particles, small particles are not effectively blocked.

Engine oil lubrication systems, which are typical of many fluid systems, frequently include a filter assembly which has a filter formed from a porous filter medium for removing damaging particles from the lubricating oil utilized in the system. Mechanical wear within the engine, the outside environment, and contaminants accidentally introduced during normal servicing provide a source of large particles which may plug lubricating nozzles or severely damage parts and create excessive wear on any surfaces relying on a thin film of the lubricating oil for protection.

These systems typically rely upon a pump to force the oil through the filter and then circulate the filtered oil to the moving parts of the engine for lubrication. Oil is forced through the filter by limited pressure developed on the upstream side of the filter by the oil pump. The pressure required to force oil to pass through the filter at a given rate will be greater for more viscous or thick oils or for filters formed from finer pored filter media, i.e., porous filter media having smaller average or mean pore diameters.

Viscosity is a measure of the resistance of the fluid to flow, or, in other words, the sluggishness with which the fluid moves. When the viscosity is low, the fluid is thin and has a low body; consequently, the fluid flows easily. Conversely, when the viscosity is high, the fluid is thick in appearance and has a high body; thus, the fluid flows with difficulty.

Oil is generally thicker or more viscous at low temperatures and thus, when an engine is started and the engine parts and oil are cold, a larger pressure is required to force the oil through the filter than after the engine has reached operating temperature. Since the pump frequently has limited pressure capabilities, many systems include a bypass valve, which will open when the pressure exceeds a predetermined value and allow oil to bypass the filter. This results in unfiltered oil being pumped through the engine where large particles may harm the moving parts and clog passages. Further, the high upstream pressure developed during a cold start may cause the lighting of a high pressure oil light, erroneously indicating that the filter is dirty or that the lubrication system is otherwise obstructed.

Automatic self-compensating flow control lubrication systems for continuously supplying the requisite amount of lubricant to at least one moving component of a drive system are known in the art. Various applications require that fluid condition in a mechanical system be continuously monitored and adjusted to maintain optimum overall system performance.

Present lubrication systems of the type used, for example, in drive systems for gas turbine engines are designed to supply a near constant oil pressure to fixed jets in the various engine components which require lubrication including bearing package, gears and the like. Systems such as this are designed to supply the minimum flow required for the worst case. This philosophy inevitably leads to excessive flow conditions in most other engine operating modes. Deteriorating system conditions, such as clogging jets, cannot be corrected and require operator attention with the possibility of mission cancellation.

In addition to the primary flow functions of the system, present configurations include some diagnostic and condition monitoring provisions. However, these are mainly warning lights and/or gages, which require crew attention and only add to the operator workload.

One such system is disclosed in U.S. Pat. No. 5,067,454 ("the Waddington et al. reference"). The disclosed invention relates to an automatic self compensating flow control lubrication system. One or more operating parameters, such as scavenge temperature, are continuously monitored and the information provided to a computer. The computer operates the first stage solenoid valve of a two stage valve assembly which provides such an amount of lubricant to the component as is necessary to maintain a predetermined value of the operating parameter. Scavenge temperature is one such operating parameter.

In the operation of this lubrication system, oil or other suitable liquid lubricant, is drawn from a reservoir by means of a suitable pump through a replaceable filter assembly which incorporates a controlled bypass valve which, together with the filter assembly is an integral part of the pump assembly. The bypass valve allows essentially dirty oil to be supplied to the components of the drive system requiring lubrication in emergency situations during which the filter is clogged. Alternatively, it operates to continue flow of oil during cold weather starting when the oil is too viscous to pass through the filter.

A computer controlling operation of the lubrication system controls whether and when the bypass valve opens. Other similar prior art systems open and close the bypass valve at fixed points, which have the effect of reducing filter life. The Waddington reference, by opening the bypass valve only when absolutely necessary, increases filter life and life of the drive system by reducing the time that dirty oil is supplied to the components requiring lubrication.

U.S. Pat. No. 4,783,271 ("the Silverwater reference") discloses a filter assembly which removes particles from a fluid and which comprises two filters and a structure for directing the fluid first through one filter and then through the other. Each filter includes a porous filter medium. However, the filter medium of the downstream filter is coarser than the filter medium of the upstream filter, i.e., the mean pore diameter of the porous filter medium of the downstream filter is greater than the mean pore diameter of the porous filter medium of the upstream filter.

The filter assembly further includes a mechanism for sensing the temperature of the fluid and a valve, which is responsive to the temperature-sensing mechanism. The valve is arranged in parallel with the upstream filter so that, when the fluid temperature reaches a predetermined value as sensed by the sensing mechanism, the valve opens, allowing the fluid to bypass the upstream filter and flow through the coarser downstream filter. For example, in one embodiment of the invention, the valve is open when the fluid temperature is below the predetermined value.

With the filter assembly according to the Silverwater reference, the fluid is always filtered, regardless of the temperature of the fluid. When the fluid temperature increases, e.g., approaches the normal operating temperature, and reaches a predetermined value, as sensed by the sensing mechanism, the valve closes, causing all the fluid to flow through both filters. Thus, the finer upstream filter removes all particles from the fluid while the coarser downstream filter serves as a backup filter in case the upstream filter is damaged or defective.

However, when the temperature of the fluid, as sensed by the sensing mechanism, falls below the predetermined value, e.g., falls below a predetermined lower limit when the engine is shut down, the valve opens. Consequently, when the engine is next started, the fluid partially bypasses the upstream filter but all of the fluid is passed through the coarser downstream filter.

The downstream filter may frequently be physically smaller than the upstream filter. Therefore, in order to minimize the obstruction to flow by the downstream filter when filtering cold, viscous oil, the downstream filter preferably has a much larger mean pore diameter than the upstream filter. However, the mean pore diameter of the downstream filter is nonetheless small enough that the filtration provided by the downstream filter is sufficient to remove any large particles which may have been introduced into the fluid.

The size and the weight of a filter assembly are major factors in hydraulic system design, especially in aerospace applications. These demands, coupled with the further requirements of low pressure drop, high flow rates and improved fatigue life at continually increasing operating pressures, require departure from the standard design approach in hydraulic systems.

Therefore, there is a need for an innovative approach in the design of a high pressure hydraulic filter module, which provides both the required performance (low pressure drop at a high flow condition) and the structural integrity (1,000,000 impulse cycles from 0 to 6000 psi) and at the same time reducing the weight by as much as 50% from a conventional design.

BRIEF DESCRIPTION OF THE DRAWINGS

FIG. 2 illustrates conventional approach utilizing two filters;

FIG. 3A illustrates an assembly drawing of a priority valve according to an embodiment of the present invention;

FIG. 5 illustrates a pressure filter bowl according to an embodiment of the present invention;

FIG. 6B illustrates a filter media according to an embodiment of the present invention;

FIGS. 7A–7D illustrate various views of the pressure filter module assembly with a priority valve according to an embodiment of the present invention;

DETAILED DESCRIPTION

Advancement in hydraulic systems in the 4000+psi operating range requires an innovative filter design approach to meet the high performance requirements, i.e., low pressure drop at a high flow condition, structural integrity (1,000,000 impulse cycles from 0 to 6000 psi.), and reduced size and weight. To meet these requirements using a standard approach would require a filter element or elements with an excessive amount of media area. This in turn will make the filter assembly extremely large, very heavy, and structurally unsound, or alternatively, require two filter assemblies.

Figure 1A:
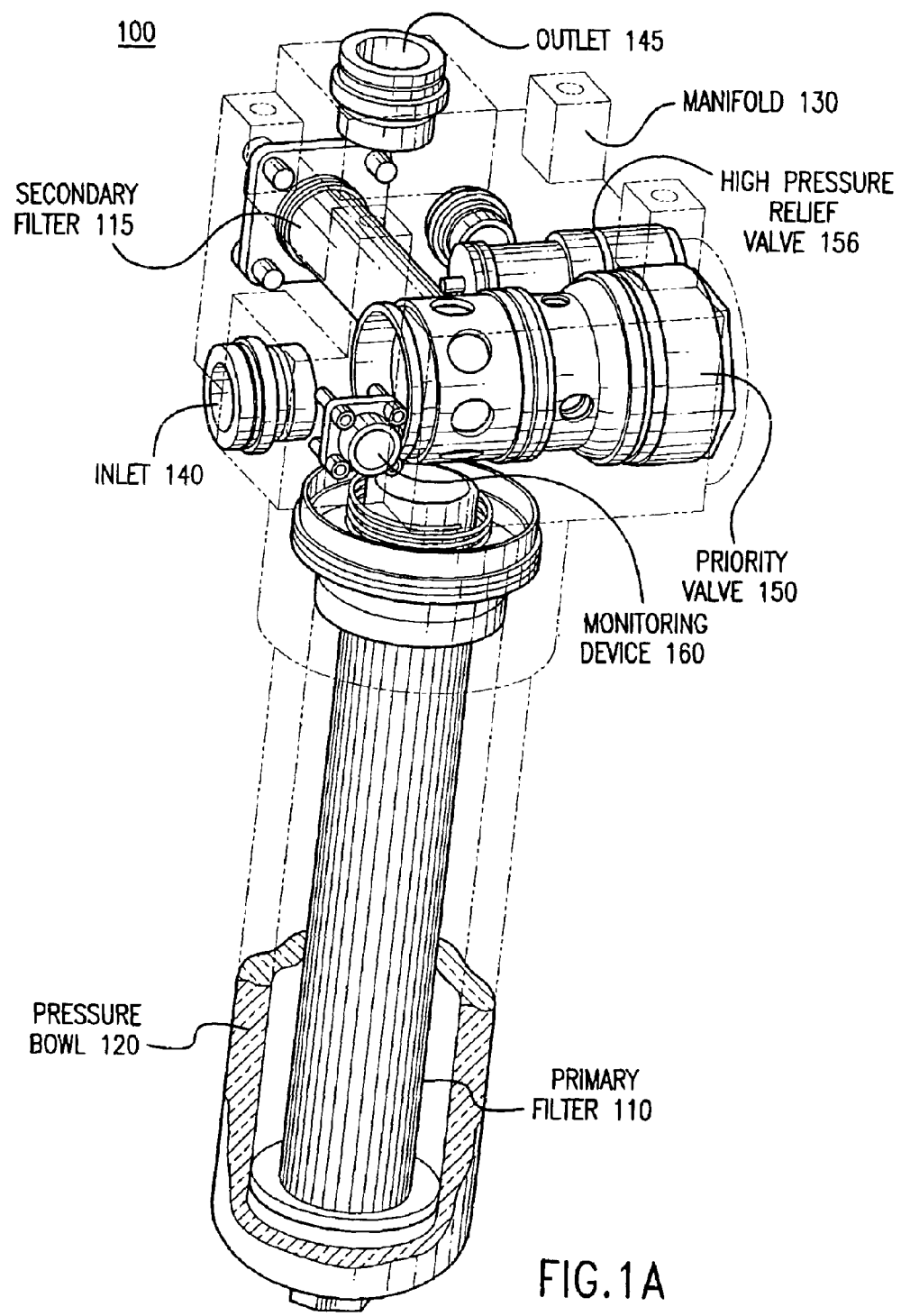
FIG. 1A illustrates a pressure filter module assembly with a priority valve according to an embodiment of the present invention.

FIG. 1A illustrates a high pressure filter module assembly 100 that may, for example, be interposed in a line before a load to provide full flow filtering. Filter module assembly 100 may include a high pressure manifold 130, a disposable primary filter element 110, and a high pressure filter bowl 120 which is liquid-tightly connected at one end to the high pressure manifold 130 and is closed at the other end. The high pressure manifold 130 may include a fluid inlet passage 140, a fluid outlet passage 145, a priority valve 150, a disposable secondary filter element 115, and a high pressure relief valve 156. In addition, filter module assembly 100 may include a prognostic and health monitoring device 160 to measure pressure, temperature and flow.

Under normal flow operating conditions, the flow enters the high pressure manifold 130 through the fluid inlet passage 140. The priority valve 150 allows the flow, for example up to 40 gpm, to enter the primary circuit (flow through the primary filter element 110), and flow out through the fluid outlet passage 145.

During peak flow conditions when the flow demand exceeds 40 gpm, the priority valve 150 directs flow in excess of 40 gpm, for example up to 160 gpm, to the secondary circuit (flow through the secondary filter 115) and out through the fluid outlet passage 145.

Figure 1B:
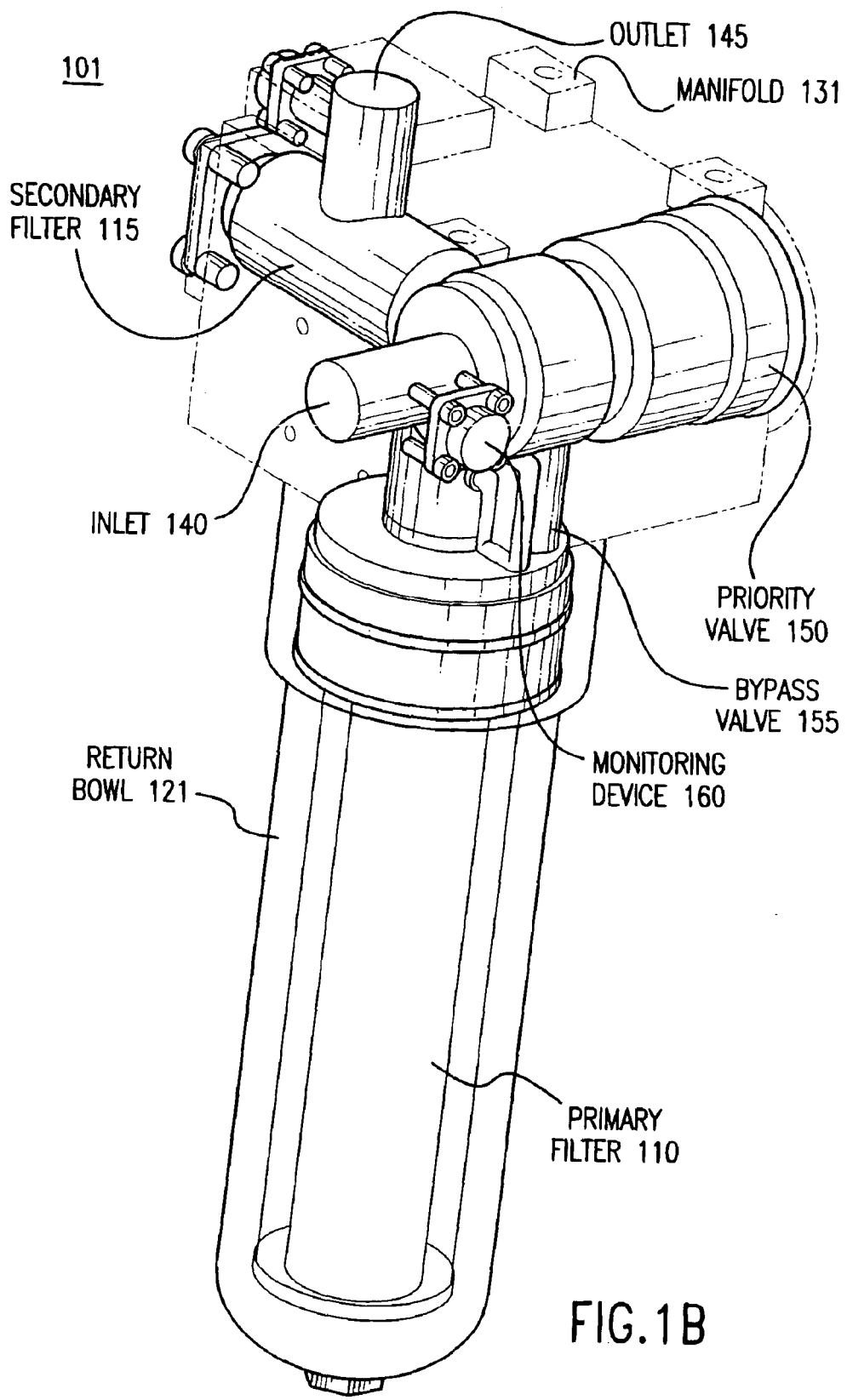
FIG. 1B illustrates a return filter module assembly with a priority valve according to an alternative embodiment of the present invention.

FIG. 1B illustrates an alternative embodiment of the present invention. A return filter module assembly 101 is also designed for low pressure drop at a high flow condition, but is used at lower pressure and impulse levels. The return filter module assembly 101 may, for example, be interposed in a return line between the load and a sump. Return filter module assembly 101 may include a return manifold 131, a disposable primary filter element 110, and a return filter bowl 121 which is liquid-tightly connected at one end to the return manifold 131 and is closed at the other end. The return manifold 131 may include a fluid inlet passage 140, a fluid outlet passage 145, a priority valve 150, and a disposable secondary filter element 115. The return filter module assembly 101 may include a bypass valve 155. In addition, return filter module assembly 101 may also include a prognostic and health monitoring device 160 to measure pressure, temperature and flow.

The high pressure filter module assembly 100 utilizes the priority valve 150 installed in the high pressure manifold 130 to allow for continuous filtration of the hydraulic fluid up to a predetermined flow value (e.g. up to 40 gpm) and diverts the occasional high flow to the secondary circuit. This approach provides both the required performance (low pressure drop at a high flow condition) and the structural integrity (1,000,000 impulse cycles from 0 to 6000 psi) and at the same time may reduce the weight by as much as 50% from a conventional design approach.

FIG. 2 illustrates a conventional design approach that requires two filter assemblies combined in parallel as shown in the schematic drawing. Two filters are required to meet the required performance (low pressure drop at a high flow condition) and the structural integrity (1,000,000 impulse cycles from 0 to 6000 psi).

The filter design including the priority valve 150 is based on the observation that in certain applications, the normal flow requirement in a system may be, for example 40 gpm, with only occasional peak flows up to 200 gpm. In more defined terms, it may be that the peak flow of 200 gpm occurs during 5% of the operational time of an aircraft and a flow up to 100 gpm occurs less than 15% of the time. The remaining 80% of the time the flow is no greater than 40 gpm.

Based on this understanding, the pressure filter module assembly 100 provides continuous filtration of 40 gpm (primary circuit) and allows for the bypassing of any excess flow, up to 160 gpm (secondary circuit), through a priority valve 150. The excess flow is filtered through a parallel secondary filter 115. The primary and secondary filters form a parallel combination to provide for a lower pressure drop as compared to a series combination of two filters.

It should be understood that the two scenarios 1) 200 gpm- (40 gpm filtered and 160 gpm bypassed), and 2) 100 gpm (40 gpm filtered and 60 gpm bypassed) will still maintain the oil integrity to ensure peak performance. The bypassing of the flow does not degrade the performance of the hydraulic circuit or associated components because of its relative short duration and secondary filtration.

The purpose of the priority valve 150 is to guarantee that all available flow up to a predetermined flow (e.g. 40 gpm) will go to a primary (priority) circuit, including the primary filter 110. Any excess flow (e.g. up to 160 gpm) will be diverted to a parallel secondary circuit. This parallel secondary flow or excess flow is filtered through a more open higher micron rating filter 115 before the fluid exits through the outlet 145. One common inlet 140 and outlet 145 is used for both circuits eliminating the need for additional plumbing.

The return filter module assembly 101 also utilizes a priority valve 150 installed into a return manifold 131 that allows for continuous filtration of the hydraulic fluid up to a predetermined flow value (e.g. up to 40 gpm) and diverts the occasional high flow to a secondary circuit.

FIG. 3A illustrates the priority valve 150 according to embodiments of the present invention. Priority valve 150 includes a valve body 300, first circular apertures 301, second circular apertures 302, metering orifice 310, end fitting 320, piston assembly 330 including a first cylindrical portion 332 and second cylindrical portion 333 containing circular apertures 331, retainer 340, spring 350, and spring guide 360.

Figure 3B:
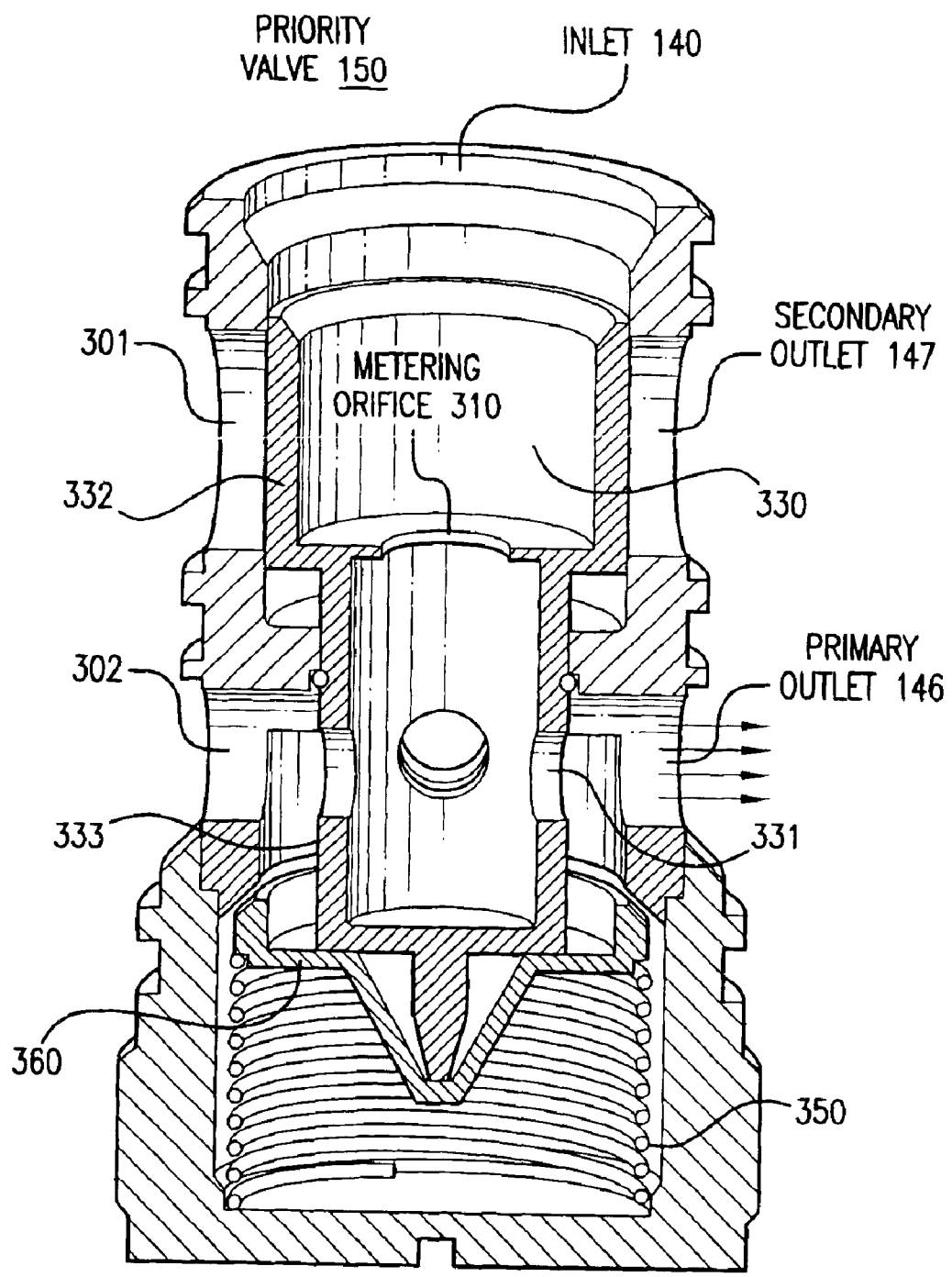
FIG. 3B illustrates a priority valve in the closed position relative to the secondary outlet according to an embodiment of the present invention.

With reference to FIG. 3A and FIG. 3B, the piston assembly 330 is slidably mounted within the valve body 300, the spring 350 being biased in a first shape in contact with the spring guide 360 urging the piston assembly 330 into a first position within the valve body 300 to close the first cylindrical portion 332 of the piston assembly 330 over the plurality of first circular apertures 301 of the valve body 300 when the flow rate of a fluid is below a predetermined fluid flow rate.

Figure 3C:
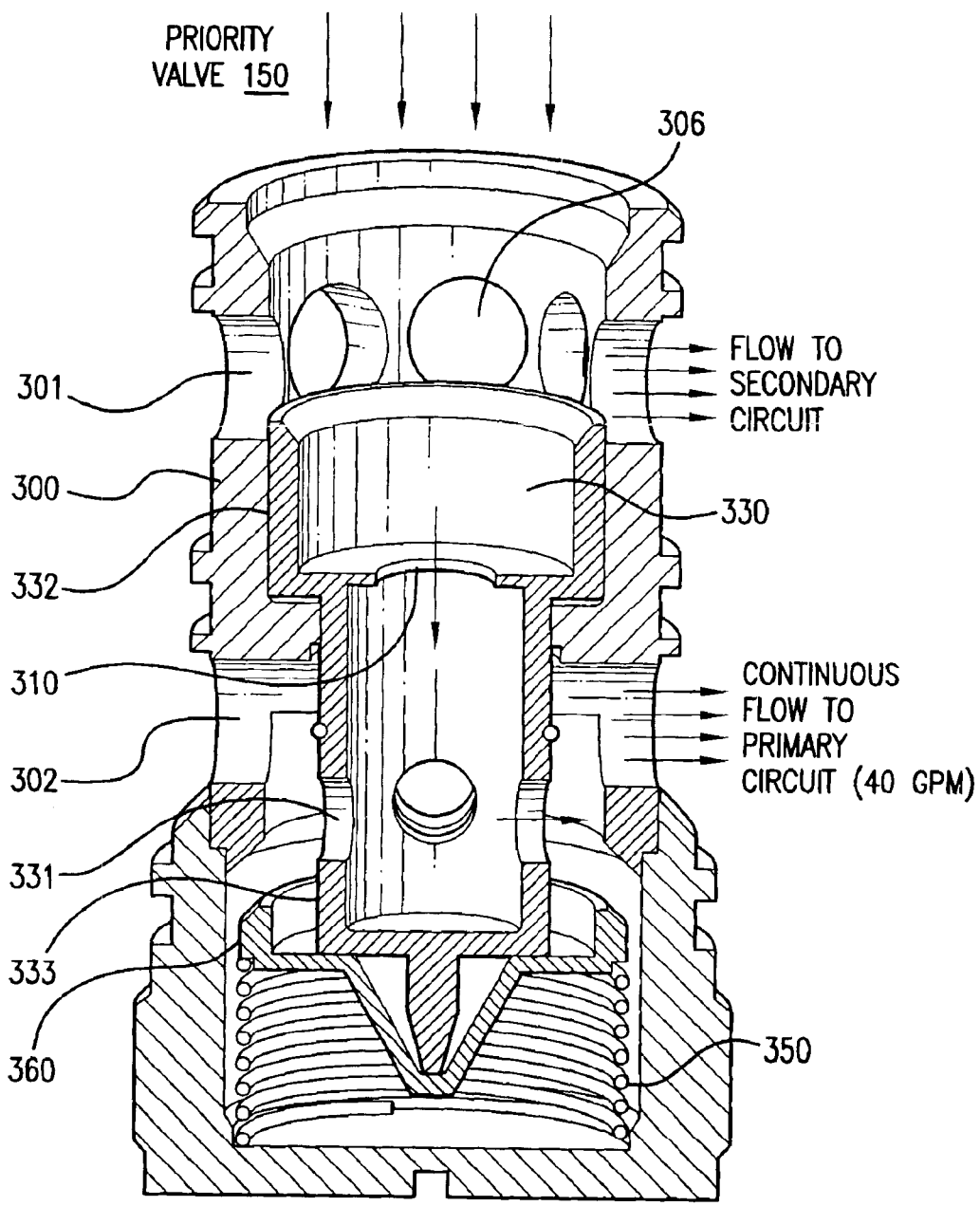
FIG. 3C illustrates a priority valve in the open position relative to the secondary outlet according to an embodiment of the present invention.

Furthermore, with reference to FIG. 3A and FIG. 3C, the spring 350 being biased in a plurality of shapes in contact with the spring guide 360 allowing the first cylindrical 332 portion of the piston assembly 330 to move away from the first position to allow the first cylindrical portion 332 of the piston assembly 330 to expose the plurality of first circular apertures 301 of the valve body 300 when the flow rate of the fluid is above a predetermined fluid flow rate, the plurality of first circular apertures 301 of the valve body 300 then being in communication with a first passage 306 (see FIG. 3C) to form a fluid pathway secondary circuit, the plurality of spring 350 shapes and the amount of exposure of the plurality of first circular apertures 301 of the valve body 300 is proportional to the flow rate of the fluid. The exposure of the plurality of first circular apertures 301 of the valve body 300 defines the second piston metering land.

FIG. 3B illustrates that when the priority valve 150 is initially closed, flow is directed through the primary circuit, from primary inlet 140 to the primary outlet 146, and the secondary circuit is closed off The pressure drop across the metering orifice 310 in the piston assembly 330 is not high enough to overcome the installed spring 350 force, therefore the piston assembly 330 remains in the first position within the valve body 300. In this position the plurality of first circular apertures 301 in the valve body 300 are not exposed and thus the second piston metering land (the exposure of the circular apertures 301 in the valve body 300 by the piston assembly 330) is closed preventing flow to the secondary circuit. All flow will be ported to the primary circuit through the plurality of circular apertures 331 in the second cylindrical portion 333 of the piston assembly 330 and the second circular apertures 302 in the valve body 300.

FIG. 3C illustrates that as the flow to the primary circuit increases, the pressure drop across the metering orifice 310 in the piston assembly 330 overcomes the installed spring 350 force forcing the piston assembly 330 downward away from the first position within the valve body 300 to expose the plurality of first circular apertures 301 in the valve body 300. This opens the second piston metering land, and bypasses the excess flow to the secondary circuit. If the primary flow across the fixed orifice 310 decreases below the set gpm rating, the spring 350 bias force will close off the secondary piston metering land to assure all the flow available will be ported to the primary circuit through the plurality of circular apertures 331 in the second cylindrical portion 333 of the piston assembly 330 and the second circular apertures 302 in the valve body 300. (Refer back to FIG. 3B.)

Figure 4A:
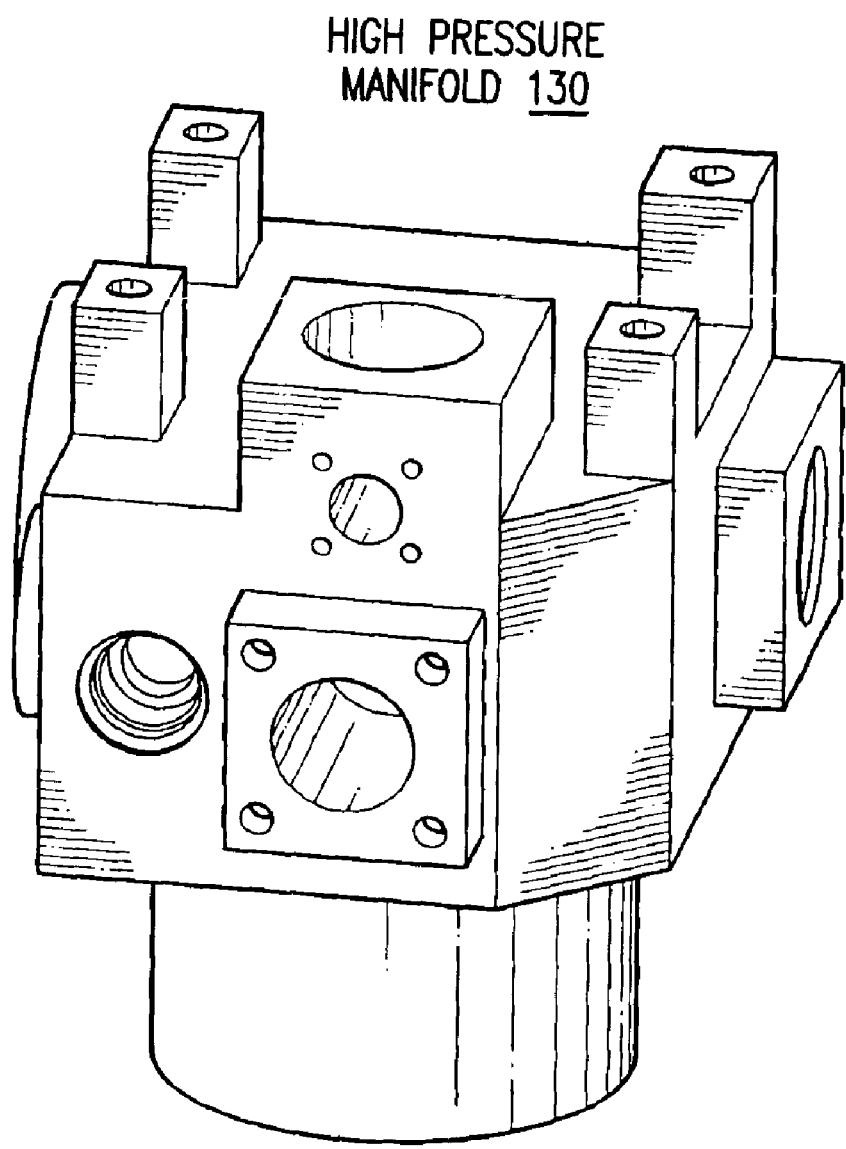
FIG. 4A illustrates a pressure manifold housing according to an embodiment of the present invention.

FIG. 4A illustrates a high pressure manifold 130 according to an embodiment of the present invention. The high pressure manifold 130 may be constructed from anodized titanium material TI-6AL-4V. The use of titanium is recommended because of the filter modules specification and performance requirements. Due to the relatively large size, high pump discharge pressure levels and the stringent qualification impulse requirements, titanium provides the best strength to weight ratio over other material options.

Previous experience dictates that for high pressure systems and severe impulse requirements (1,000,000 cycles from 0 to 6000 psi) the use of titanium is necessary to ensure the success of the qualification while still providing a product with the least weight. In an alternative embodiment of the present invention, the high pressure manifold 130 may be manufactured using Precipitation Hardened Stainless Steel bar 15-5 PH.

Figure 4B:
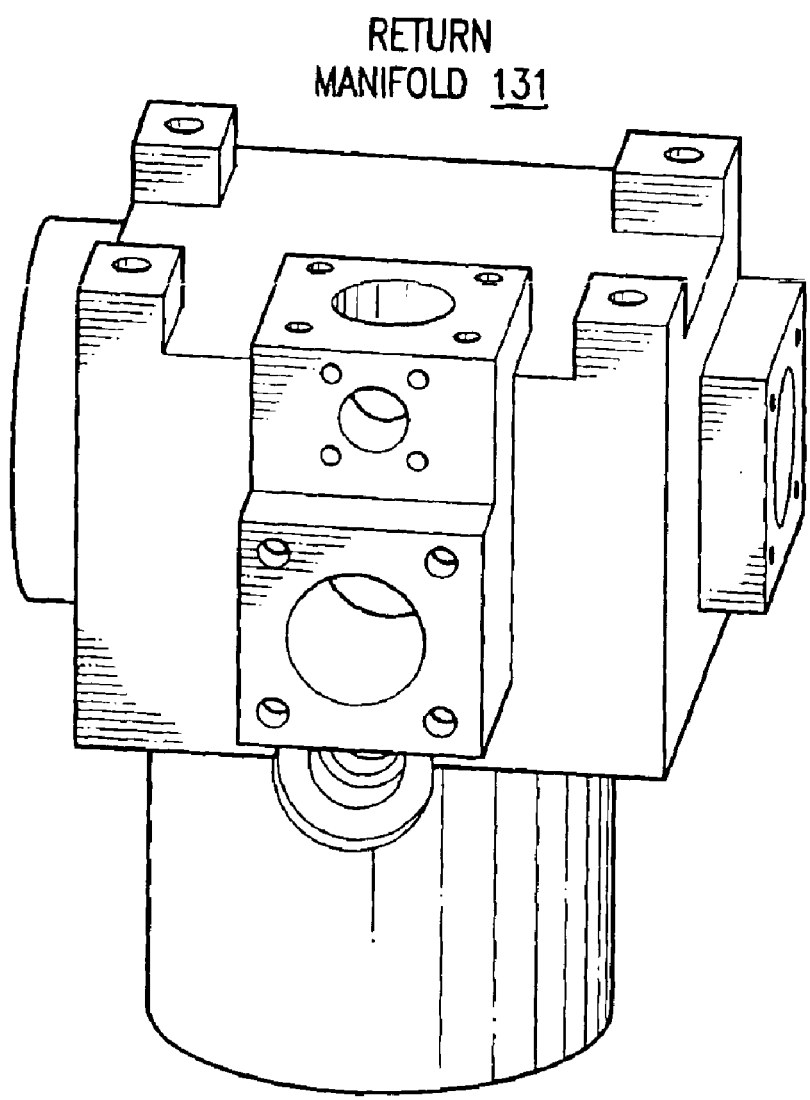
FIG. 4B illustrates a return manifold housing according to an alternative embodiment of the present invention.

FIG. 4B illustrates the return manifold 131 according to an alternative embodiment of the present invention. The return filter manifold 131 may be manufactured using anodized 7075-T7351 aluminum or 2024-T851 aluminum.

FIG. 5 illustrates the high pressure filter bowl 120 according to an embodiment of the present invention. The high pressure filter bowl 120 is constructed from TI-6AL-4V. The bowl achieves the desired fatigue life of the high pressure manifold 130. The high pressure filter bowl 120 houses the primary filter element 110 and is removable for replacement of the primary filter element 110.

The return filter bowl 121 (not shown) is the same size and shape as the high pressure filter bowl 120. The return filter bowl 121 may be manufactured using anodized 7075-T7351 aluminum or 2024-T851 aluminum. The return filter bowl 121 also houses the primary filter element 110 and is removable for replacement of the primary filter element 110.

The high pressure filter bowl 120 and return filter bowl 121 may be installed and tightened by hand. Both filter bowls 120, 121 include a knurled friction pad for this purpose. No other equipment, fitting, etc. is required to remove or disconnect the bowl and its respective element for servicing/maintenance. In the event that hand torque is not adequate for bowl removal, a wrenching pad 510 is provided at the bottom of each bowl. This design allows removal of the bowl with standard tools, but does not allow over torquing. The pitch diameters of the bowl threads 520 are modified to preclude false installation of the similarly sized and shaped pressure and return bowls. The high pressure filter bowl 120 may be secured to the high pressure manifold 130 with lockwire. Alternatively, a more maintenance friendly locking lever can also be provided if required.

Figure 6A:
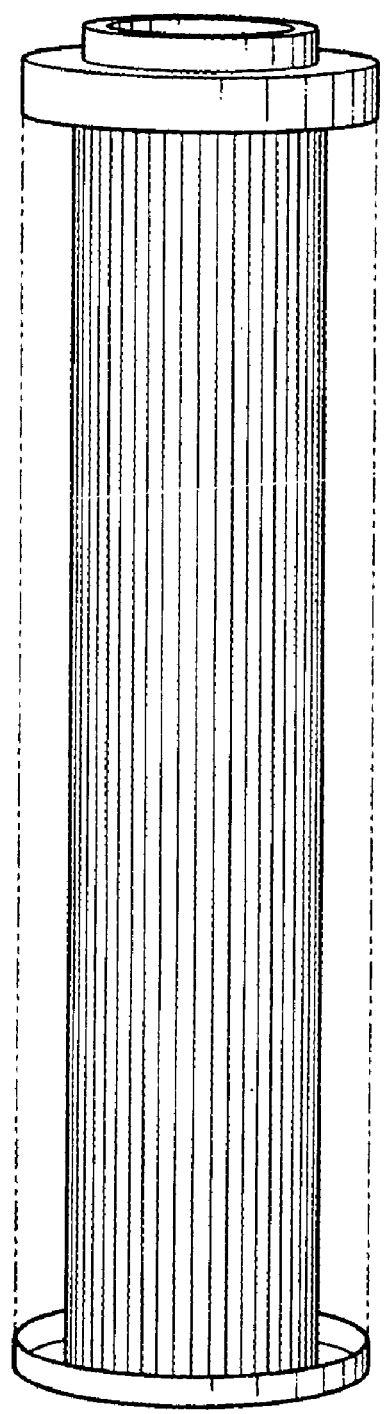
FIG. 6A illustrates a filter element according to an embodiment of the present invention.
Figure 7C:
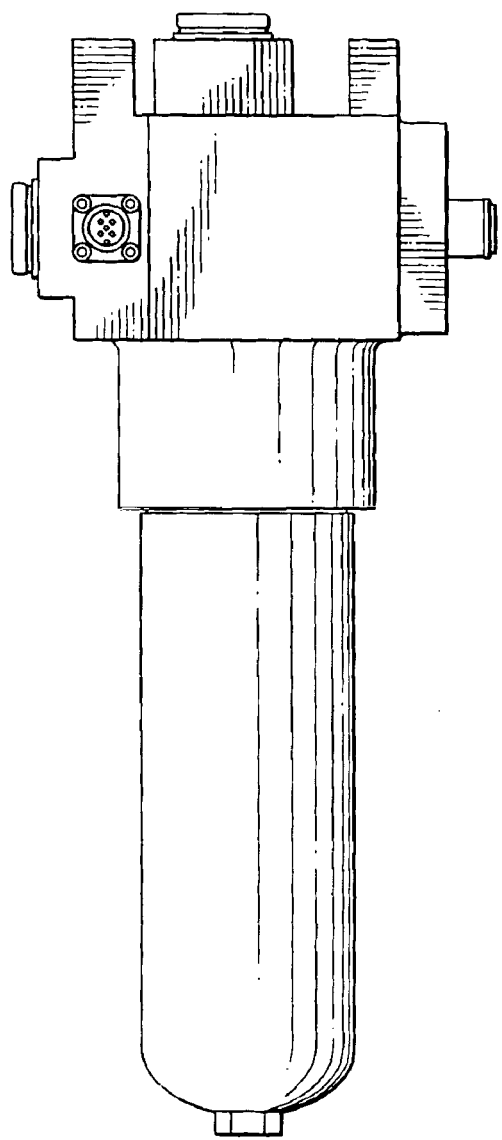
Figure 7D:
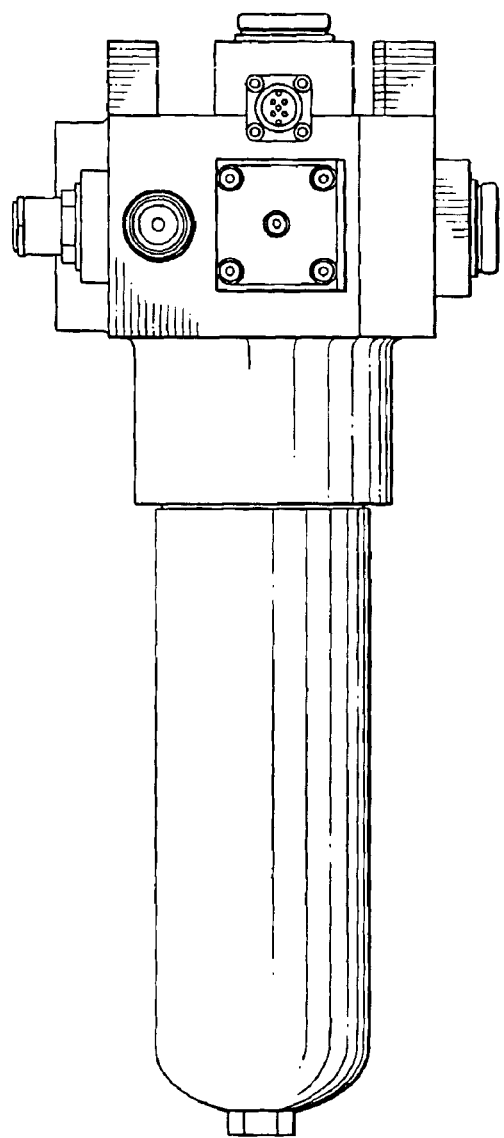

FIG. 6A illustrates the primary filter element 110 according to an embodiment of the present invention. Multi-layered filter media provides optimum filtration capability. The primary filter element 110 is a high pressure high collapse (in this case 6000 psi) filter element. Referring to FIG. 6B, the media pack assembly 600 is the core of the primary filter element 110. The media pack 600 may consist of four or more layers of porous material.

The outer layer 610, a corrosion resistant steel (CRES) mesh, is for protection during handling. The second layer 620 is the actual filter media that provides the filtration efficiency and retained dirt capacity. It may consist of an epoxy modified phenolic resin impregnated glass fiber matrix. The third layer 630 provides flow distribution and is used to support the media. All additional layers 640 are to further support the media pack as needed. These layers are pleated, formed into a cylinder to maximize the filter area then side sealed with epoxy.

The center tube assembly (not shown) consists of a tube and a wire mesh cylinder. The tube is a rolled and butted perforated sheet, with the hole-pattern, thickness and material designed to meet the required pressure drop and collapse strength (some high pressure applications use cylinder wire "slinky"). The cylinder of CRES wire mesh is wrapped around the center tube to prevent the pleated pack assembly from pushing through the holes in the perforated center tube at high differential pressure. Filter element fittings and end caps are machined or stamped from 300 series CRES and passivated.

At assembly, the tube assembly is inserted into the media pack assembly 600 which are in turn attached to the fitting and end cap with a suitable adhesive. All materials and adhesives used in the filter element assemblies have been shown through testing to be fully effective for filtering fluids over the entire fluid temperature range of −65° F. to +275° F. (i.e. in this case MIL-PRF-83282 and MIL-PRF-87257).

FIGS. 7A–7D illustrate various views of the pressure filter module assembly according to an embodiment of the present invention. The envelope of the module may be as small as 23.1 inch×10.1 inch×9.95 inch. The calculated dry weight of the pressure filter assembly may be as light as 70.0 lb. The high pressure manifold 150 may be equipped with inlet 710 and outlet 720 sensors that allow for continuous monitoring of pressure, temperature and flow.

In an alternative embodiment of the present invention, the return filter assembly (not shown) may be as small as 22.5 inch×8.5 inch×9.95 inch, and may have a lower calculated dry weight of 48.0 lb maximum (due to the use of aluminum for the manifold and bowl).

Figure 8A:
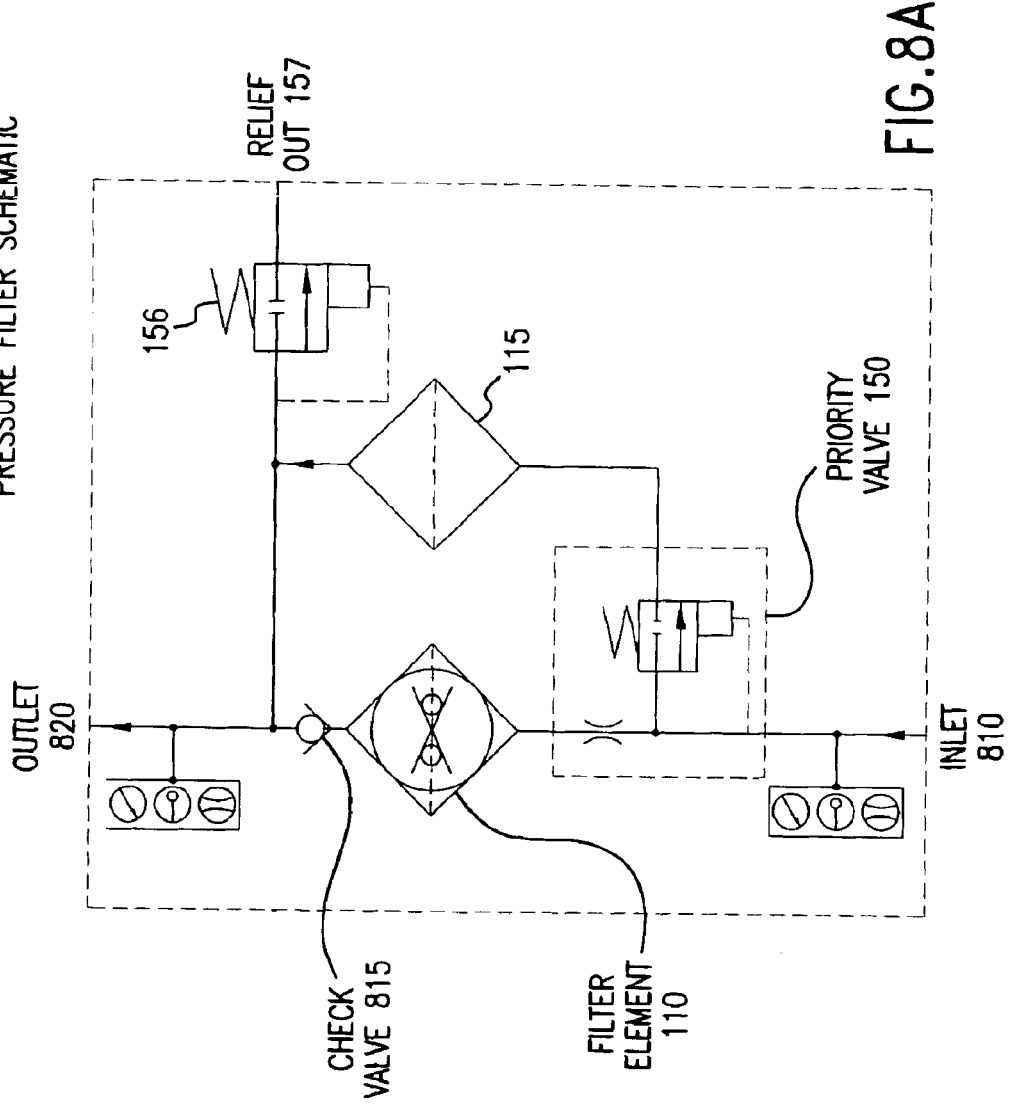
FIG. 8A illustrates a schematic drawing of the pressure filter module assembly with a priority valve according to an embodiment of the present invention.
Figure 8B:
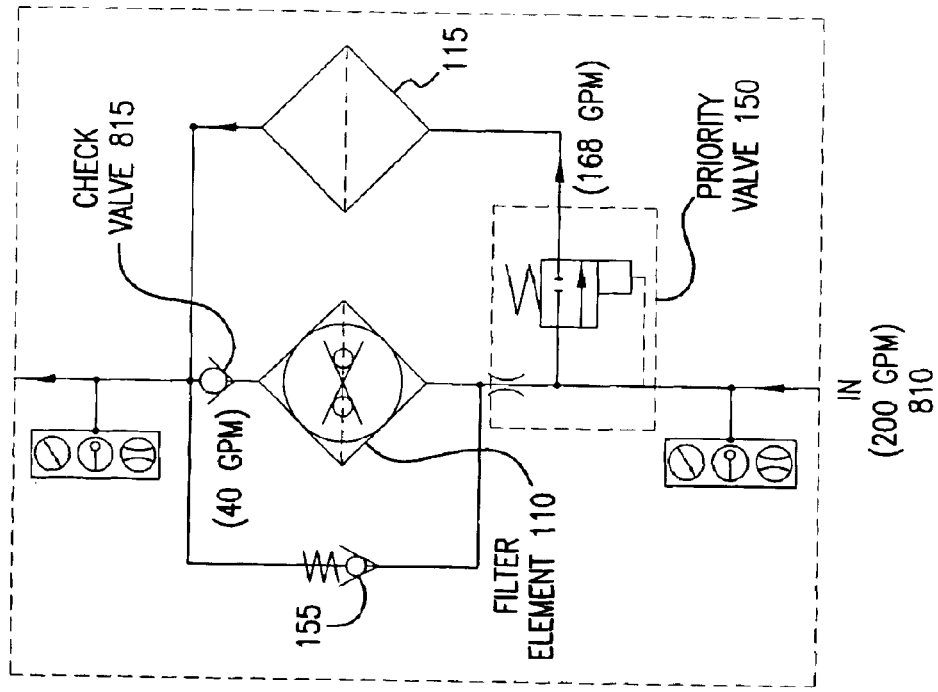
FIG. 8B illustrates a schematic drawing of the return filter module assembly with a priority valve according to an alternative embodiment of the present invention.

A system schematic of the pressure filter module assembly 100 and return filter module assembly 101 are shown in FIGS. 8A and 8B, respectively. The schematics illustrate the various flow paths and the associated component locations. Under normal flow operating condition, the flow enters the manifold through the inlet port 810. The primary circuit allows flow up to 40 gpm to enter the primary filter element 110 and flow out through a check valve 815 (which serves also as an outlet shutoff valve) to the outlet port 820.

During peak flow conditions when the flow demand exceeds 40 gpm, a priority valve 150 in the module directs flow in excess of 40 gpm up to 160 gpm, to the secondary circuit through a secondary filter 115 and out through a common outlet port 820.

FIG. 1A and FIG. 8A illustrates the pressure filter module assembly 100 may include a high-pressure relief valve 156 provided downstream of the primary filter element 110 and secondary filter element 115 to relieve the flow, up to 200 gpm, through the relief valve outlet port 157 in case of a system problem (valve malfunctions downstream causing potential catastrophic increase of system pressure) downstream of the pressure filter module assembly 100.

FIG. 1B and FIG. 8B illustrates the return filter assembly 101 may include a bypass valve 155 in parallel with the primary filter element 110 to allow bypassing of the primary flow, up to 40 gpm, to the outlet port 820 in the case of filter element blockage.

While the description above refers to particular embodiments of the present invention, it will be understood that many modifications may be made without departing from the spirit thereof The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A filter module assembly for removing particles from a fluid, the filter module assembly comprising:
   a manifold housing having an inlet for receiving the fluid to be filtered, an outlet for expelling the fluid, and fluid flow paths therebetween, said manifold housing being attached atop a filter bowl;
   a parallel combination of a first filtering element contained within said filter bowl and a second filtering element completely contained within said manifold housing, each having a porous filter medium; and
   a fluid flow rate responsive valve arranged in communication with the inlet, the first filtering element, and the second filtering element, said valve being activated when a fluid flow rate through the inlet increases above a predetermined threshold value, the amount of fluid above said threshold value being diverted away from said first filtering element and through said second filtering element while the amount of fluid at and below said threshold value continues to pass through said valve to said first filtering element, said valve being contained completely within the manifold housing and not in direct communication with the outlet or a downstream side of the first filtering element, wherein fluid filtered in said first filtering element and fluid filtered in said second filtering element is expelled through said outlet.

2. The filter module assembly of claim 1 wherein the filter medium of at least one of the filtering elements is pleated.

3. The filter module assembly of claim 1 wherein the filter medium of at least one of the filtering elements has a hollow, generally cylindrical configuration.

4. The filter module assembly of claim 1 wherein the filter module assembly includes a high pressure relief valve.

5. The filter module assembly of claim 1 wherein the filter module assembly includes a bypass valve.

6. The filter module assembly of claim 1 wherein the filter module assembly includes a device to measure pressure, temperature, and flow.

7. A filter module assembly comprising:
   a manifold housing having an inlet for receiving a fluid to be filtered, an outlet for expelling the fluid, and fluid flow paths therebetween, said manifold housing being attached atop a filter bowl;
   a primary filtering element and a secondary filtering element positioned in parallel to define a primary circuit fluid flow path and a secondary circuit fluid flow path respectively, the primary filtering element being contained within the filter bowl, the secondary filtering element being contained completely within the manifold housing, each filtering element including a porous filter medium, a mean pore diameter of the porous filter medium of the primary filtering element being smaller than a mean pore diameter of the porous filter medium of the secondary filtering element; and
   a fluid flow rate responsive valve for selectively directing at least a portion of the fluid away from the primary filtering element and through the parallel secondary filtering element, said valve including:
      a piston including a metering orifice,
      a spring, and
      a valve body, said valve being activated when a fluid flow rate through the inlet increases above a predetermined fluid flow rate, said piston moving relative to said valve body to allow the amount of fluid above the predetermined fluid flow rate to be directed away from said primary filtering element and through said secondary filtering element while the amount of fluid at and below the predetermined fluid flow rate continues to pass through said metering orifice to said primary filtering element, said valve being contained completely within the manifold housing and not in direct communication with the outlet or a downstream side of the primary filtering element, wherein fluid filtered in said primary filtering element and fluid filtered in said secondary filtering element is expelled through said outlet.

8. The filter module assembly of claim 7 wherein the primary filtering element has a hollow, generally cylindrical configuration, and the secondary filtering element is a metal screen filter element, wherein the fluid flow rate responsive valve communicates between the inlet, the primary filtering element, and the secondary filtering element.

9. The filter module assembly of claim 7 wherein the primary filtering element includes a perforated core and the porous filter medium is pleated, the pleated porous filter medium being disposed about the perforated core.

10. A filter module assembly comprising:
    a manifold housing having an inlet for receiving a fluid to be filtered, an outlet for expelling the fluid, and fluid flow paths therebetween, said manifold housing being attached atop a filter bowl;

a primary filtering element and a secondary filtering element positioned in parallel to define a primary circuit fluid flow path and a secondary circuit fluid flow path respectively, the primary filtering element being contained within said filter bowl, and the secondary filtering element being contained completely within the manifold housing; and a fluid flow rate responsive valve for selectively directing at least a portion of the fluid away from the primary filtering element and through the parallel secondary filtering element, said valve being activated when a fluid flow rate through the inlet increases above a predetermined fluid flow rate, the amount of fluid at and below the predetermined fluid flow rate continues to pass through said valve to said primary filtering element and the amount of fluid above the predetermined fluid flow rate being directed away from said primary filtering element and through said secondary filtering element, said valve being contained completely within the manifold housing and further including:

a piston including a metering orifice, a spring, and a valve body of larger diameter than, and coaxial with, the piston, the valve body including a plurality of first circular apertures, wherein the piston is slidably mounted within the valve body, the spring being biased in a first shape urging the piston into a first position within the valve body to close the piston over the plurality of first circular apertures when the flow rate of the fluid is below the predetermined fluid flow rate, and the spring being biased to allow the piston to move away from the first position to allow the piston to expose the plurality of first circular apertures when the flow rate of the fluid is above the predetermined fluid flow rate, the plurality of first circular apertures then being in communication with the secondary circuit fluid flow path, the amount of exposure of the plurality of first circular apertures being proportional to the flow rate of the fluid, wherein fluid filtered in said primary filtering element and fluid filtered in said secondary filtering element is expelled through said outlet.

11. The filter module assembly of claim 10 wherein the primary filtering element has a hollow, generally cylindrical configuration, and the secondary filtering element is a metal screen filter element, wherein the fluid flow rate responsive valve communicates between the inlet, the primary filtering element, and the secondary filtering element.

12. The filter module assembly of claim 10 wherein the primary filtering element includes a perforated core and the porous filter medium is pleated, the pleated porous filter medium being disposed about the perforated core.

13. The filter module assembly of claim 10 wherein the filter medium of at least one of the filtering elements is pleated.

14. The filter module assembly of claim 10 wherein the filter medium of at least one of the filtering elements has a hollow, generally cylindrical configuration.

15. The filter module assembly of claim 10 wherein the filter module assembly includes a high pressure relief valve.

16. The filter module assembly of claim 10 wherein the filter module assembly includes a bypass valve.

17. The filter module assembly of claim 10 wherein the filter module assembly includes a device to measure pressure, temperature, and flow.

18. A filter module assembly comprising:

a manifold housing having an inlet for receiving a fluid to be filtered, an outlet for expelling the fluid, and fluid flow paths therebetween, said manifold housing being attached atop a filter bowl;

a primary filtering element and a secondary filtering element positioned in parallel to define a primary circuit fluid flow path and a secondary circuit fluid flow path respectively, the primary filtering element being contained within said filter bowl, the secondary filtering element being contained completely within the manifold housing; and a fluid flow rate responsive valve for selectively directing at least a portion of the fluid away from the primary filtering element and through the parallel secondary filtering element, said valve being activated when a fluid flow rate through the inlet increases above a predetermined fluid flow rate, an amount of fluid at and below the predetermined fluid flow rate continuing to pass through said primary filtering element and an amount of fluid above the predetermined fluid flow rate being directed away from said primary filtering element through said secondary filtering element, and said valve being contained completely within the manifold housing and further including:

a piston including a metering orifice and a plurality of circular apertures, a spring, and a valve body of larger diameter than, and coaxial with, the piston, the valve body including a plurality of first circular apertures and a plurality of second circular apertures, the plurality of circular apertures of the piston being in constant communication with the plurality of second circular apertures to further communicate with the primary circuit fluid flow path to allow a continuous flow of fluid below the predetermined fluid flow rate, wherein the piston is slidably mounted within the valve body, the spring being biased in a first shape urging the piston into a first position within the valve body to close the piston over the plurality of first circular apertures when the flow rate of the fluid is below the predetermined fluid flow rate, and the spring being biased to allow the piston to move away from the first position to allow the piston to expose the plurality of first circular apertures when the flow rate of the fluid is above the predetermined fluid flow rate, the plurality of first circular apertures then being in communication with the secondary circuit fluid flow path, the amount of exposure of the plurality of the first circular apertures being proportional to the flow rate of the fluid, wherein fluid filtered in said primary filtering element and fluid filtered in said secondary filtering element is expelled through said outlet.

19. The filter module assembly of claim 18 wherein the primary filtering element has a hollow, generally cylindrical configuration, and the secondary filtering element is a metal screen filter element, wherein the fluid flow rate responsive valve communicates between the inlet, the primary filtering element, and the secondary filtering element.

20. The filter module assembly of claim 18 wherein the primary filtering element includes a perforated core and the porous filter medium is pleated, the pleated porous filter medium being disposed about the perforated core.

21. The filter module assembly of claim 18 wherein the filter medium of at least one of the filtering elements is pleated.

22. The filter module assembly of claim 18 wherein the filter medium of at least one of the filtering elements has a hollow, generally cylindrical configuration.

23. The filter module assembly of claim 18 wherein the filter module assembly includes a high pressure relief valve.

24. The filter module assembly of claim 18 wherein the filter module assembly includes a bypass valve.

25. The filter module assembly of claim 18 wherein the filter module assembly includes a device to measure pressure, temperature, and flow.

* * * * *